(No Model.) 3 Sheets—Sheet 1.
A. A. HUMBLE.
BREAD MAKING MACHINE.
No. 381,554. Patented Apr. 24, 1888.
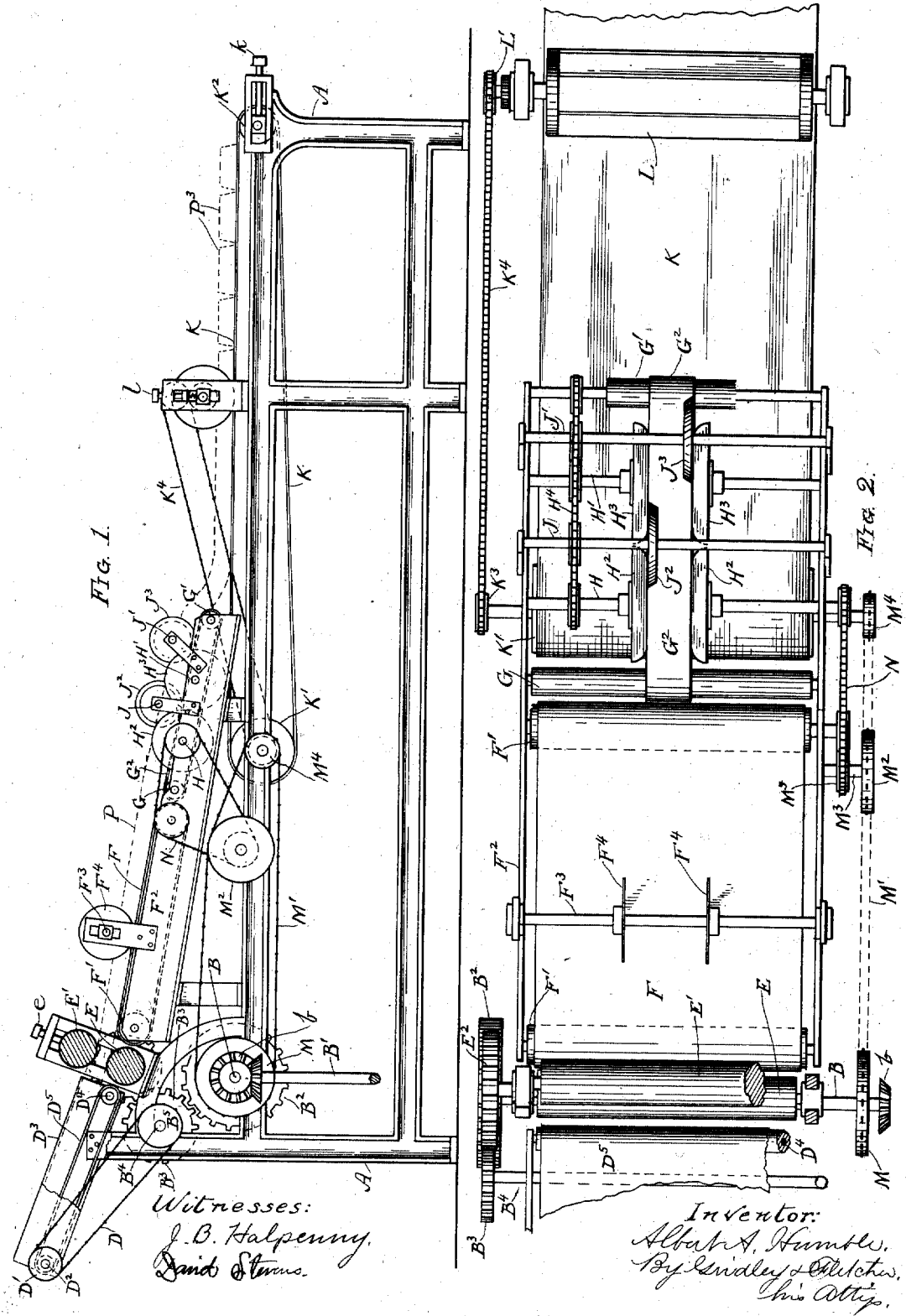
Witnesses:
J. B. Halpenny.
David Stevens.
Inventor:
Albert A. Humble.
By Sidley & Fletcher,
his Attys.

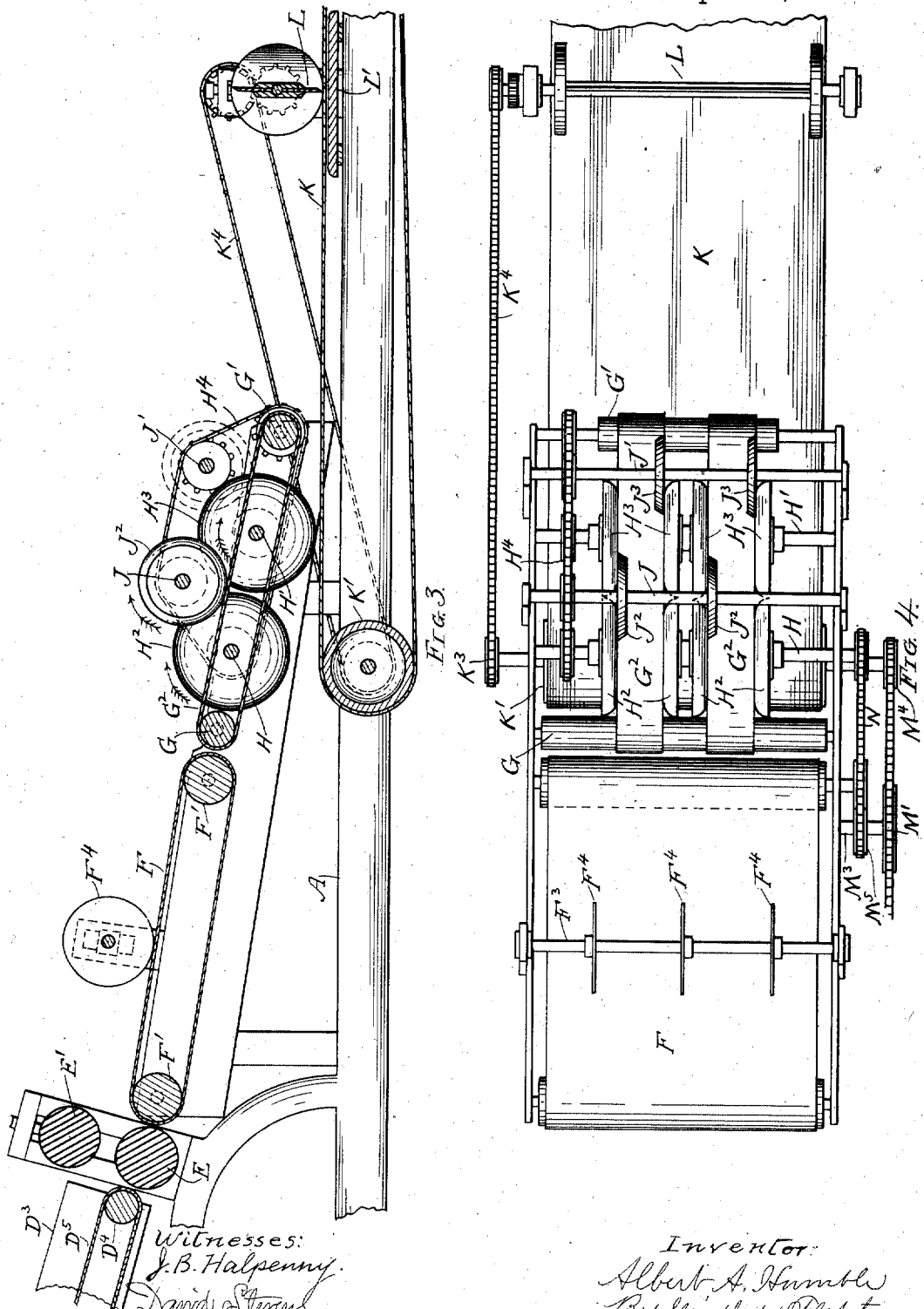

(No Model.) 3 Sheets—Sheet 3.
A. A. HUMBLE.
BREAD MAKING MACHINE.
No. 381,554. Patented Apr. 24, 1888.
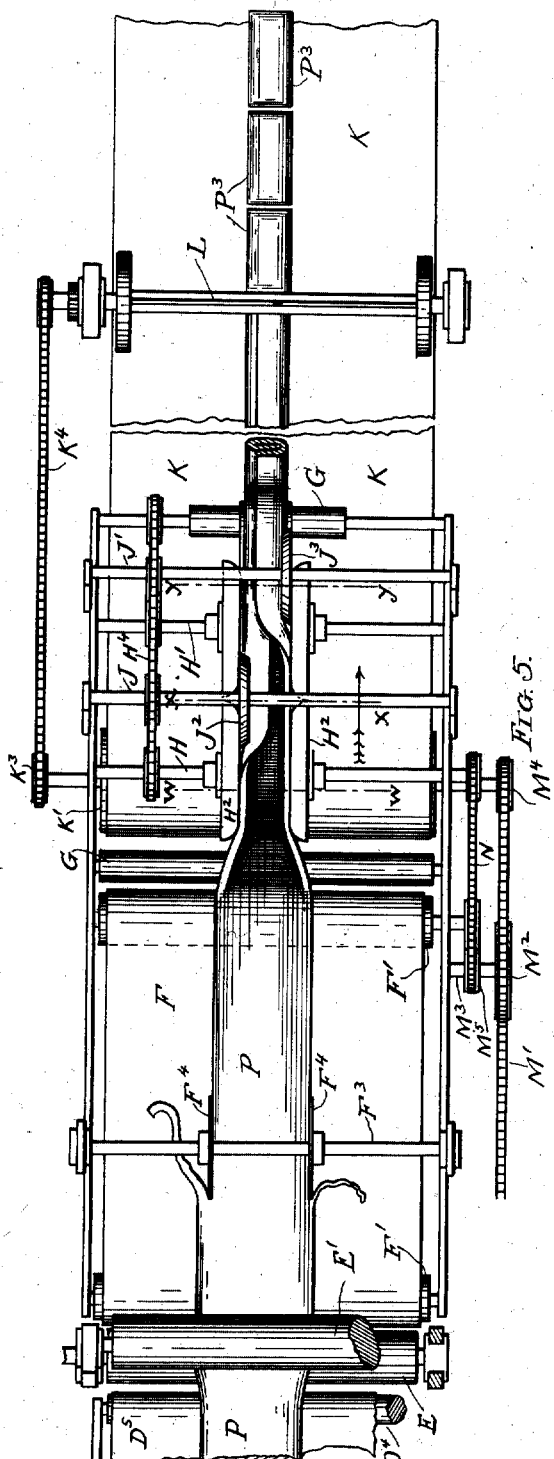
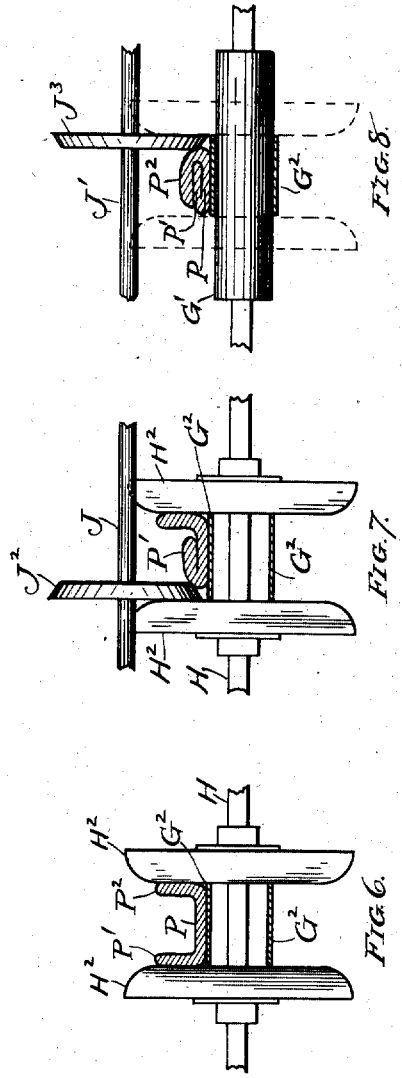
Witnesses:
J. B. Halpenny.
David Stevens.
Inventor:
Albert A. Humble
By Gridley & Fletcher
his Attys.

UNITED STATES PATENT OFFICE.

ALBERT A. HUMBLE, OF CHICAGO, ILLINOIS, ASSIGNOR OF ONE-HALF TO WILLIAM H. ALDRICH, OF SAME PLACE.

BREAD-MAKING MACHINE.

SPECIFICATION forming part of Letters Patent No. 381,554, dated April 24, 1888.

Application filed January 21, 1888. Serial No. 261,528. (No model.)

*To all whom it may concern:*

Be it known that I, ALBERT A. HUMBLE, of Chicago, in the county of Cook and State of Illinois, have invented certain new and useful Improvements in Bread-Making Machines, of which the following is a description, reference being had to the accompanying drawings, forming a part of this specification, in which—

Figure 1 is a side elevation of my improved machine. Fig. 2 is a plan view of the same, showing one set of forming-rolls. Fig. 3 is a central longitudinal sectional view of said machine, broken off at the respective ends. Fig. 4 is a detail view of a portion of said machine, showing two sets of cutting-disks and forming-rolls. Fig. 5 is a plan view of the machine as it appears when in operation, with the dough passing through and being formed therein; and Figs. 6, 7, and 8 are sectional views in detail, upon the lines $w\ w$, $x\ x$, and $y\ y$, respectively, Fig. 5, as viewed in the direction of the arrow there shown.

Like letters of reference designate corresponding parts in the different figures.

The object of my invention is to so construct a bread-making machine that the dough shall be passed through it continuously and at a uniform rate of speed in a body of uniform width and thickness, and while so passing that the outer edges may be rolled or folded in upon the main body, and, finally, that said part so folded may be subdivided into loaves of the same or approximately the same weight without breaking the outer skin upon their sides and without requiring the use of scales to determine said weight.

To this end my invention consists in the combination of elements, hereinafter more particularly described, and definitely pointed out in the claims.

In the drawings—

A represents the frame of the machine.

B, Figs. 1 and 2, is the main driving-shaft, which in turn is driven by means of gears $b\ b$, connecting it with a shaft, B', which communicates with the motive power. Upon the opposite end of the shaft B is a gear, $B^2$, which meshes into a gear, $B^3$, upon a shaft, $B^4$, upon which is mounted a sprocket-wheel, $B^5$, which is connected by means of a sprocket-chain, D, and wheel D' to a shaft, $D^2$, mounted in bearings in an inclined frame or chute, $D^3$, at the lower end of which is a second shaft, $D^4$. Both of said shafts are provided with rollers thereon, which are connected by means of a canvas apron, $D^5$. At the lower end of the feeding-apron are feeding-rolls E E', one of which is driven by the gear $E^2$, Fig. 2, while the other is arranged in adjustable bearings and adjusted by means of set-screws $e$, Fig. 1, so that the distance between the two rolls may be varied at will. Following said feeding-rolls is a secondary inclined apron, F, mounted upon rolls F' F', the shafts of which are arranged in bearings in an inclined frame-work, $F^2$, above and rigidly secured to the main frame. About midway between the rolls F' F', above the apron F, is a shaft, $F^3$, provided with two or more cutting-disks, $F^4$, thereon, which are rotated by contact with the dough upon the apron F, as hereinafter described. Rollers G G' are also mounted in the inclined frame F and connected by means of a narrow apron, $G^2$, of canvas or other flexible material. Mounted in bearings in the frame $F^2$ are shafts H H', to which are rigidly secured two or more conoidal-shaped rolls, $H^2\ H^2\ H^3\ H^3$, or rolls the peripheries of which are tapered inwardly toward each other. The apron $G^2$ is arranged to pass between said rolls and over and under the shafts to which they are respectively attached, as more clearly shown in Figs. 3, 6, and 7, so that a considerable portion of said rolls are above the apron $G^2$. Located in a plane above the shafts H H', and loosely secured in bearings attached to the frame $F^2$, are shafts J J', to the former of which is attached a beveled roll or disk, $J^2$, and to the latter a like roll, $J^3$. Each of said disks is of such a diameter as to cause its periphery to touch the apron, or nearly so, and one is located upon one side and the other upon the opposite side of said apron, with their outer faces respectively against or very close to the inner faces of the rolls $H^2\ H^3$, respectively, as more clearly shown in Figs. 2, 3, and 4.

Beneath the rolls described and the narrow apron or aprons $G^2$ (one or more, as the case may be) I place a third apron, K, which is mounted upon rolls K' $K^2$, attached to shafts which are fitted in proper bearings in the frame. The latter of said bearings is rendered adjustable by means of set-screws $k$, Fig. 1, so as to tighten the canvas apron thereon when desired.

At about midway between the roll G' and the outer end of the apron $K^2$, I provide a double-edged rotating knife, L, which is journaled in bearings in the frame, made adjustable by means of set-screws $l$, Fig. 1. Beneath the apron K, below the knife, I place a board, L', Fig. 3, which rests upon the frame and serves as a support to the apron during the cutting operation, as hereinafter described.

Having described the leading features of the machine, I will now proceed to describe the manner in which they are actuated and their mode of operation in molding the bread.

Upon the shaft B is rigidly secured a sprocket-wheel, M, which is connected by a chain, M', to a sprocket-wheel, $M^2$, upon an axle, $M^3$, having a suitable bearing in the frame A, and to a second sprocket-wheel, $M^4$, upon the outer end of the shaft which operates the roller K'. A sprocket-wheel, $M^5$, is also attached to the axle $M^3$, and connected by means of a chain, N, to like sprocket-wheels upon the shaft H and the shaft of the forward roller, F'. Sprocket-wheels are also attached rigidly to the shafts H H' J J', as well as to the shaft upon which the roller G' is secured, and all are connected with each other by means of a sprocket-chain, $H^4$, Figs. 2, 3, 4, and 5. Upon the opposite side of the machine from the wheel $M^4$, and attached to the shaft upon which the roller K' is mounted, I place a sprocket-wheel, $K^3$, which is connected to a like wheel, L', upon the end of the shaft to which the revolving knife L is secured, or to one geared to said shaft, by means of a chain, $K^4$. The chain M' drives the wheels $M^2 M^4$. These in turn, through the rollers F' and K' and chains N, $H^4$, and $K^4$, actuate the aprons F, $G^2$, and K, the rods $H^2$ $H^3$ $J^2$ $J^3$, and the cutter L, all of which parts, with the apron $D^5$ and feed-rolls E E', move continuously and in unison.

The operation of said machine in practice is as follows: The dough P, Fig. 1, after being mixed and passed through kneading-rolls until it attains the proper consistency, is placed upon the apron $D^5$, from whence it is fed through the feeding-rolls E E' upon the apron F. The rolls compress it to the proper thickness, and the cutters $F^3$ gage the width by cutting off the margins upon each side of the strip, as clearly indicated in said figure; thence, being of uniform width and thickness, it passes upon the narrow apron $G^2$, which is considerably narrower in width than the strip of dough, when it is acted upon by the forming-rolls, all of which rotate in the same direction, and as indicated by the arrows shown in Fig. 3. The rolls H $H^2$ first receive the ribbon of dough and bend the edges upwardly to a vertical position, thus forming it into a U shape in cross-section, as shown in Figs. 5 and 6. Meeting the roll $J^2$, the upturned flange P' upon one side is folded down upon the main body, as represented in Fig. 7, whence it passes onto the second roll, $J^3$, which acts upon the flange $P^2$ and folds it down upon the part P', as shown in Fig. 8. The folding operation being thus completed, the strip of dough passes upon the apron K and under the rotating knife L, which cuts it into loaves $P^3$ of uniform size.

By passing the dough continuously through the entire machine, all the parts of which act in unison, it does not "creep," as it is liable to do when it is conveyed with an intermittent movement, but retains a uniform width and thickness, and hence the loaves when cut from the strip are so nearly uniform in weight as to show scarcely any appreciable variation when placed upon the scale. Moreover, as the dough is folded upon itself, a protecting-skin is formed around it, which prevents the escape of the gas therein and greatly improves its quality when baked. Thus it will be seen that the operation of forming the loaves may be conducted with great speed and accuracy, which enable loaves of good quality and uniform size and weight to be produced without "scaling" or additional kneading.

In Figs. 1, 2, and 5 I have shown a single set of molding-rolls in order to illustrate the machine in its simplest form; but it is obvious that the number may be indefinitely increased, according to the width of the machine. In Fig. 4 I have shown two sets of forming-rolls and two aprons, $G^2$, in connection therewith. I do not therefore confine myself to any specific number of forming-rolls for a given machine, as it is obvious that the number may be varied at will without departing from the essential features of my invention. In lieu of the apron $D^5$, the ordinary board or hopper may be employed; but I prefer the apron, for the reason that it assists the feeding-rolls and causes the dough to pass through the rolls uniformly, whereas without it the rolls, by pulling the dough through, and hence dragging it upon the stationary board, as is necessary, tends to stretch some portions more than others and to render it thin and less compact in parts, which results in varying the weight of the loaves.

Having thus described my invention, I claim—

1. In a bread-making machine, the combination of an apron narrower than the strip of dough to be fed thereto, rolls upon opposite sides of said apron having rounded faces for turning up the edges of the dough strip, and auxiliary rolls, one in advance of the other, for alternately folding one and then the other of said edges, and means, as chains and sprocket-wheels, for actuating said apron and rolls in unison, substantially as shown and described.

2. The combination, in a bread-making machine, of the apron F, in proximity to rolls for feeding the dough thereto, cutters $F^4$, arranged to operate in conjunction with said apron, a narrow apron, $G^2$, forming rolls $H^2$ $H^3$, folding-rolls $J^2$ $J^3$, all having inner beveled or rounded faces, and means, such as chains and sprocket-wheels, for actuating said several parts in unison, substantially as shown and described.

3. The combination, in a bread-making machine, of the feed-rolls $E$ $E'$, apron $F$, arranged to receive the dough therefrom, cutters $F^4$, arranged above and to operate in conjunction with said apron, narrow apron $G^2$, arranged in the path of the dough, forming rolls $H^2$ $H^3$ $J^2$ $J^3$, having inner rounded or beveled faces and arranged substantially as specified, and means, such as chains and sprocket-wheels, for actuating said parts in unison, substantially as shown and described.

4. The combination, in a bread making machine, of the feed-apron $D^5$, feed-rolls $E$ $E'$, arranged to receive the dough therefrom, apron $F$, arranged in the path of the dough, cutters $F^4$, constructed to operate in conjunction with said apron, narrow apron $G^2$, forming rolls $H^2$ $H^3$ $J^2$ $J^3$, arranged substantially as specified, and having interior rounded or beveled faces, and means, such as chains and sprocket-wheels, for actuating said parts in unison, substantially as shown and described.

5. In a bread-making machine, the combination of a feeding-apron for receiving the dough, feeding-rolls for imparting a uniform thickness to the dough, a receiving-apron, means, as revolving cutters, in conjunction therewith for trimming the strip or strips of dough to a uniform width, one or more narrow aprons for receiving the strips thus gaged, forming rolls upon each side of said narrow apron or aprons for turning up the edges of said dough, secondary forming-rolls upon opposite sides of said apron, one in advance of the other, for alternately folding one and then the other of said edges upon the main body, a receiving-apron for said roll or rolls thus formed, a revolving cutter, and means, as a series of chains and sprocket-wheels, for actuating said parts in unison, substantially as shown and described.

6. The combination, with a bread-making machine provided with feeding-rolls, cutters, and aprons for gaging the thickness and width of the dough and conveying it continuously through the machine, of one or more aprons narrower than the width or widths, respectively, of the strip or strips of dough so gaged, forming rolls upon the respective sides thereof for raising the edges of the strip, folding-rolls for alternately folding one and then the other of said strips upon the main body, a revolving cutter for dividing it into loaves when so folded, and means, as belts and gears, for actuating said parts in unison, substantially as shown and described.

ALBERT A. HUMBLE.

Witnesses:
D. H. FLETCHER,
J. B. HALPENNY.